(12) United States Patent
Hartford et al.

(10) Patent No.: US 9,334,959 B2
(45) Date of Patent: May 10, 2016

(54) RADIALLY NOTCHED PISTON RINGS

(71) Applicants: Matthew Hartford, Phoenix, AZ (US); Joseph D. Moriarty, Glendale, AZ (US); Kurt W. Johnson, Buford, GA (US)

(72) Inventors: Matthew Hartford, Phoenix, AZ (US); Joseph D. Moriarty, Glendale, AZ (US); Kurt W. Johnson, Buford, GA (US)

( * ) Notice: Subject to any disclaimer, the term of this patent is extended or adjusted under 35 U.S.C. 154(b) by 30 days.

(21) Appl. No.: 14/476,925

(22) Filed: Sep. 4, 2014

(65) Prior Publication Data

US 2016/0069455 A1    Mar. 10, 2016

(51) Int. Cl.
  *F16J 9/00*   (2006.01)
  *F16J 9/12*   (2006.01)
  *F16J 9/26*   (2006.01)

(52) U.S. Cl.
  CPC ..... *F16J 9/12* (2013.01); *F16J 9/26* (2013.01)

(58) Field of Classification Search
  CPC .................. F16J 9/00; F16J 9/12; F16J 9/206
  See application file for complete search history.

(56) References Cited

U.S. PATENT DOCUMENTS

| | | | |
|---|---|---|---|
| 1,499,571 A | 7/1924 | Davis | |
| 1,974,386 A | 9/1934 | Zeledon | |
| 1,999,494 A * | 4/1935 | Zahodiakin | F16J 9/203 277/463 |
| 2,262,311 A * | 11/1941 | Zahodiakin | F16J 9/061 277/465 |
| 2,311,731 A * | 2/1943 | Bowers | F16J 9/20 277/465 |
| RE24,930 E | 1/1961 | Marien | |
| 3,174,763 A * | 3/1965 | Hamm | F16J 9/20 277/460 |
| 4,497,494 A | 2/1985 | Allen et al. | |
| 2004/0217550 A1 * | 11/2004 | Lee | F16J 9/10 277/459 |
| 2008/0095939 A1 | 4/2008 | Fischer et al. | |
| 2010/0044969 A1 | 2/2010 | Fischer et al. | |

* cited by examiner

*Primary Examiner* — Gilbert Lee
(74) *Attorney, Agent, or Firm* — Michael W. Goltry; Robert A. Parsons; Parsons & Goltry

(57) ABSTRACT

In an annular groove carried by one of a pair of reciprocally movable members, a piston ring is carried by the annular groove for sealing the reciprocally movable members for minimizing fluid leakage between the members. The piston ring is an annular member that includes an outer contact surface engageable with the sidewall, an opposed inner surface, an end gap that severs the annular member and that defines spaced-apart first and second ends of the annular member, and annular member tension-relieving notches formed in the inner surface of the annular member. The notches are spaced-apart along the length of the annular member between the first end and the second end, and each notch has a blunt notch tip for inhibiting crack propagation in the annular member from said blunt notch tip when the annular member is tensioned.

15 Claims, 3 Drawing Sheets

RADIALLY NOTCHED PISTON RINGS

FIELD OF THE INVENTION

This invention concerns seals and, more particularly, annular seals of a type for minimizing fluid leakage between reciprocally movable members, particularly a piston and a cylinder assembly, and for reducing emissions, improving fuel economy, and decreasing oil consumption in internal combustion engines.

BACKGROUND OF THE INVENTION

Various mechanical apparatus include first and second members, which are substantially coaxial and disposed for relative reciprocal movement. Exemplary are internal combustion engines, positive displacement pumps, pneumatic motors and other mechanical devices incorporating a piston and a cylinder assembly. Other examples will occur to the skilled artisan.

Commonly, the cylinder is defined by a bore having a cylindrical sidewall. The piston, a generally cylindrical member, includes a sidewall and a top. An end wall or head, opposing the top of the piston, closes one end of the bore. A chamber of variable capacity is defined within the bore between the head and the top of the piston. Pressurized fluid functions in this chamber. In an internal combustion engines, the fluid is the expanding gas of combustion which ignites and propels the piston downwardly or away from the head. Pressurized fluid from an external source is introduced into the chamber of a pneumatic motor to force movement of the piston. In a pump, which is companion to the engine and to the pneumatic motor, fluid is compressed and pressurized in the chamber.

To provide for relative movement between the members, the diameter of the piston must be less than the diameter of the bore. Frequently, substantial clearance is required. For example, it is well known that a piston is more sensitive to thermal expansion than is a cylinder. Accordingly, where heat is a factor, such as in internal combustion engine, additional space must be provided between the sidewall of the bore and the sidewall of the piston to accommodate thermal expansion of the piston. The space, commonly referred to as sidewall clearance, is generally in the range of fifteen ten-thousandths of an inch to five one-thousandths of an inch, or greater.

However, the piston must be sealed to the cylinder. Conventionally, this is accomplished by a device commonly referred to as a piston ring, an annular seal usually fabricated of metal such as cast iron. The piston ring is received within a mating annular ring groove formed into the sidewall of the piston. To facilitate expansion during installation, and for other reasons, the piston ring is radially severed.

The spacing between the opposed ends of the severed piston ring, known as the end gap, serves various functions after installation. Having an inherent tendency to expand, the ring maintains constant tension for attendant sealing against the sidewall of the cylinder as the bore increases in diameter as a result of wear. The end gap also allows for thermal expansion of the piston ring resulting from heat generated by friction, compression of fluid, combustion of fuel and other sources.

Efficiency, economy and service life of the apparatus is directly related to blow-by. In general, less than optimum output of the apparatus results from loss of pressure or compression of the fluid. Other deleterious effects are unique to the particular apparatus. In an internal combustion engine, for example, contaminating by-products of combustion suspended in the blow-by gases are carried into the lubricating system, which harms components throughout the engine and produces an attendant power loss. In internal combustion engines, piston rings that fail to seal the pistons to the cylinders that result in the attendant blow-by can reduce the engine's power by up to forty percent depending on the engine's displacement, compression ratio and speed.

In recognition of the desirability of enhancing the seal between the piston and the cylinder, the prior art has proposed various seals, which purportedly reduce or eliminate blow-by. Several prior art proposals are direct attempts to eliminate the end gap in the conventional piston ring. Various proposals include an insert, which spans the end gap and is received in a notch formed into the ring on either side of the end gap. Other proposals include the use of a relatively thin steel member, alternately named a ribbon member or a gap seal member, having a substantially rectangular cross-section. Also advanced is a plurality of severed annular members, installed in stacked arrangement with staggered end gaps. The prior art has also advocated the use of thin steel members, colloquially dubbed rails, in combination with ring members having a general resemblance to conventional piston rings. Being of substantially heavier construction than a rail and usually fabricated of malleable material, such as cast iron, the ring member is variously referred to as a packing member or a sealing ring. The ring member in combination with the rail member forms a seal assembly of which various embodiments are known.

For various reasons, annular seals of the foregoing character are not entirely satisfactory. For example, in an assembly wherein the rail resides within the seal member and exerts an expansive force, excessive friction is generated against the sidewall of the bore. Where only the rail contacts the sidewall, seating or breaking-in of the seal is substantially retarded or even prohibited. An angled rail is subject to vibration, commonly known as ring flutter, when used in connection with a rapidly reciprocating piston. Seal assemblies of the foregoing type tend to be inherently heavy and highly tensioned so as to be prone to wear and prone to produce cylinder distortion.

Efforts to improve upon piston rings by eliminating the end gap for the purpose of eliminating or reducing blow-by disregard are more fundamental problem with known annular seals. Of particular significance is the inherent tendency of expansion of the annular seal to maintain tension for attendant sealing against the sidewall of the bore. The tension exerted against the sidewall of the bore is often unnecessarily high, which results in unwanted and premature wear than can compromise the seal leading to power loss and fuel inefficiency in internal combustion engines. The tension exerted against the sidewall of the bore is also uneven, which leads to prolonged wear-in and seating. Even after seating, the irregular tension exerted by the annular seal against the sidewall of the bore persists, which results in the irregular wear of the annular seal and the sidewall of the bore, which can produce power loss and poor fuel economy.

Of additional concern is piston ring tension. Piston ring tension is characterized by tangential tension, the amount of force needed to squeeze the ends of the ring together, and unit tension or unit pressure, the amount of pressure exerted by the contact surface of face of the ring against the cylinder wall. In the 1970s, conventional piston rings had tangential tensions of up to thirty pounds, with from 22 to 26 pounds being standard. Low compression rings, rated at from five to twelve pounds, are used in most engines today. Most aftermarket low tension rings have a somewhat higher tension than the original equipment (OE) rings they replace. For example, if an OE ring specification calls for 6 to 12 pounds, an aftermarket ring can have as much as 12 to 16 pounds. Higher tension is needed because rings are often installed in oversized cylinders. Cylinder bores can also have more distortion than a new engine, so extra loading improves sealing.

Low tension piston rings reduce friction, improving fuel economy and cylinder sealing. The amount of force the ring exerts against the cylinder wall, unit pressure or unit tension, depends on tangential tension as well as ring thickness and cylinder bore diameter. Low tension rings are inherently thinner and exert less pressure against cylinder walls than conventional rings. Low tension piston rings, being thinner than standard piston rings, unfortunately tend to become distorted when exposed to extreme engine heat, which can compromise the seal with the cylinder resulting in blow-by, loss of power, and poor fuel economy.

Accordingly, there is a need for an improved piston ring that minimizes fluid leakage between reciprocally movable members, that is selectively tensioned to reduce wear to the piston ring and the bore sidewall, that is selectively tensioned to exert even pressure against the bore sidewall, and that tends to resist distortion when exposed to extreme engine heat.

SUMMARY OF THE INVENTION

According to the principle of the invention, there is a piston ring to be received within an annular groove having opposed radial surfaces and carried by one of a pair of relatively reciprocally movable members for sealing engagement with a sidewall of the other of the pair of relatively reciprocally movable members and for minimizing fluid leakage between the members. The piston ring is a tensionable annular member that includes a first radial surface for residing adjacent to one of the radial surfaces of the groove, a second radial surface for residing adjacent to the other one of the radial surfaces of the groove, an outer contact surface engagable with the sidewall, an opposed inner surface, an end gap that severs the annular member and that defines spaced-apart first and second ends of the annular member, a length of the annular member from the first end to the second end, and annular member tension-relieving notches formed in the inner surface of the annular member, the notches are spaced-apart along the length of the annular member between the first end and the second end, and each notch has a blunt notch tip for inhibiting crack propagation in the annular member from the blunt notch tip when the annular member is tensioned. Each notch extends radially inward into the annular member from the inner surface thereof. In one embodiment, the notches are equally sized. A spacing between each notch and an adjacent notch imparts a constant annular member tension-relieving property to the annular member. Further to this embodiment, the spacing between each notch and an adjacent notch is the same. In another embodiment, a spacing between each notch and an adjacent notch imparts a variable annular member tension-relieving property to the annular member. Further to this embodiment, the spacing between each notch and an adjacent notch is varied.

According to the principle of the invention, there is a piston ring to be received within an annular groove having opposed radial surfaces and carried by one of a pair of relatively reciprocally movable members for sealing engagement with a sidewall of the other of the pair of relatively reciprocally movable members and for minimizing fluid leakage between the members. The piston ring is a tensionable annular member that includes a first radial surface for residing adjacent to one of the radial surfaces of the groove, a second radial surface for residing adjacent to the other one of the radial surfaces of the groove, an outer contact surface engagable with the sidewall, an opposed inner surface, an end gap that severs the annular member and that defines spaced-apart first and second ends of the annular member, an axial width from the first radial surface to the second radial surface, a radial thickness from the outer contact surface to the inner surface, a length of the annular member from the first end to the second end, and annular member tension-relieving notches formed in the inner surface of the annular member, the notches are spaced-apart along the length of the annular member between the first end and the second end, each notch extends radially inward into the radial thickness of the annular member from the inner surface of the annular member and axially through the axial width of the annular member from the first radial surface to the second radial surface, each notch is defined by opposed first and second side surfaces that extend radially inward from the inner surface of the annular member to a blunt notch tip, and the blunt notch tip inhibits crack propagation in the annular member from the blunt notch tip when the annular member is tensioned. In one embodiment, the notches are equally sized. A spacing between each notch and an adjacent notch imparts a constant annular member tension-relieving property to the annular member. Further to this embodiment, the spacing between each the notch and an adjacent notch is the same. In another embodiment, a spacing between each the notch and an adjacent notch imparts a variable annular member tension-relieving property to the annular member. Further to this embodiment, the spacing between each notch and an adjacent notch is varied. Each notch includes a notch width from the first side surface to the second side surface, a notch length from the inner surface of the annular ring to the notch tip, and a notch radius of the blunt notch tip. In an illustrative example, there is first ratio of from 1:2.5 to 1:4.0 of the notch length and the radial thickness of the annular ring, a second ratio of from 1:4.8 to 1:5.3 of the notch radius to the notch length, and a third ratio of from 1:1.8 to 1:2.3 of the notch radius to the notch width.

Consistent with the foregoing, the invention also includes associated methods of sealing together reciprocally movable members.

BRIEF DESCRIPTION OF THE DRAWINGS

Referring to the drawings.

DETAILED DESCRIPTION

Figure 1:
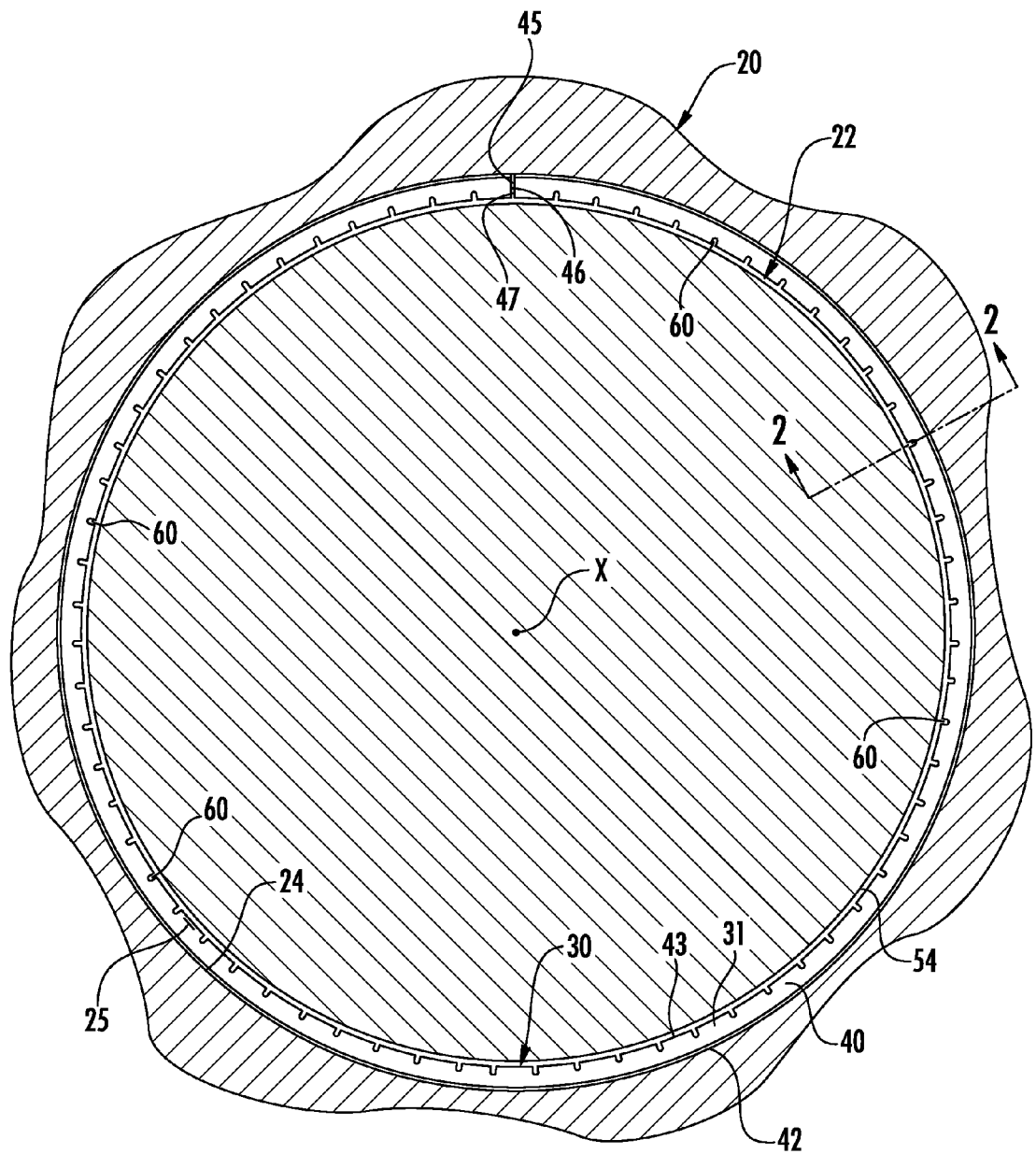
FIG. 1 is a fragmentarily horizontal section view taken along a ring groove of a typical reciprocating mechanism and especially showing a radially notched piston ring constructed and arranged in accordance with the principle of the invention shown installed in the ring groove.
Figure 2:
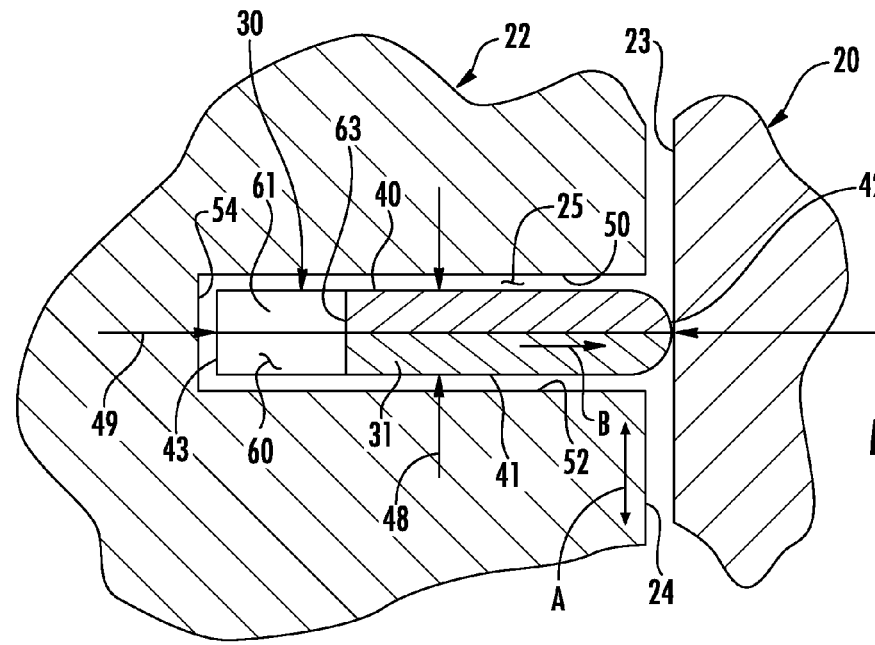
FIG. 2 is a sectional view taken along line 2-2 of FIG. 1 illustrating the piston ring installed in the mechanism.

Turning now to the drawings, in which like reference characters indicate corresponding elements throughout the several views, attention is first directed to FIG. 1 which shows a mechanism including a first member, generally designated by the reference character 20, and a second member, generally designated by the reference character 22, which are disposed for relative reciprocal movement along a linear axis X which is perpendicular to the plane of the illustration. The mechanism is typically representative of internal combustion engines, positive displacement pumps, linear fluid actuated motors and similar apparatus in which first member 20 is generally referred to as the bore or cylinder and second member 22 is usually referred to as the piston. In FIG. 2, first member 20 includes inner cylindrical sidewall 23 which is coaxial with and spaced from outer cylindrical sidewall 24, also shown in FIG. 1, of second member 22. The space, commonly termed sidewall clearance and herein exaggerated for purposes of illustration, is necessary to ensure relative movement between the members. To retard leakage, the second member 22 is provided with an annular groove 25, commonly known in the art as a ring groove, for the purpose of carrying a piston ring 30 constructed and arranged in accordance with the principle of the invention.

Piston ring 30 is an annular member 31, which is tensionable and fabricated of a malleable metal, such as cast iron, ductile iron, or steel, or other material or combination of materials useful for hydraulic or compression sealing. Annular member 31 has a first radial surface 40, a second radial surface 41, an outer contact or sealing surface 42, an opposed inner surface 43, an end gap 45 that severs annular member 31 and that defines spaced-apart first and second ends 46 and 47 of annular member 31, an annular length from first end 46 to second end 47, an axial dimension or thickness 48 that extends from first radial surface 40 to second radial surface 41, and a radial dimension or thickness 49 that extends from outer contact surface 42 to inner surface 43. The piston ring 30, a severed tensionable, annular member 31, has thickness and radial dimensions 48 and 49 to be received within annular groove 25 in accordance with standard tolerances well-known to the skilled artisan.

Annular member 31 is dimensioned to be received within annular groove 25 as illustrated in FIG. 2. Annular groove 25, which is generally rectangular in cross-section, includes first radial surface 50, second radial surface 52, and axial surface 54. The relative movement between members 20 and 22 occurs in linear directions represented by the double arrowed line A which is parallel to inner cylindrical sidewall 23. Axial thickness 48 and radial thickness 49 of annular member are dimensioned to be received in annular groove 25. First radial surface 40 of annular member 31 is for residing adjacent to first radial surface 50 of annular groove 25, second radial surface 41 of annular member 31 is for residing adjacent to second radial surface 52 of annular groove 25, outer contact surface 42 is sealingly engagable with inner cylindrical sidewall 23 of member 20, and opposed inner surface 43 of annular member 31 is for residing adjacent to axial surface 54 of annular groove 25.

As initially installed, annular member 31 appears as illustrated in FIG. 2. Axial thickness 48 and radial thickness 49 of annular member 31 are received in annular groove 25, first radial surface 40 of annular member 31 resides adjacent to first radial surface 50 of groove 25, second radial surface 41 of annular member 31 resides adjacent to second radial surface 52 of annular groove 25, outer contact surface 42 of annular member 31 is in sealing engagement with inner cylindrical sidewall 23 of first member 20, and inner surface 43 of annular member 31 resides adjacent to axial surface 54 of annular groove 25. Outer contact surface 42 is rounded in cross-section and is coated with a friction reducing material, such as chromium nitride or other selected antifriction coating. Annular member 31 is elastically expansive and, as installed, is tensioned to exert an outward force against inner cylindrical sidewall 23 bringing outer contact surface 42 of annular member 31 in sealing engagement against inner cylindrical sidewall 23 of first member 20.

Annular member 31 is sized to be closely received within groove 25. In this example, the axial dimension or thickness 48 of annular member is approximately 0.028 of an inch, a standard axial thickness. In accordance with conventional practice the axial dimension or thickness 48 of annular member 31 is approximately one one-thousandths to two one-thousandths of an inch narrower than groove 25. This clearance allows annular member 31 to move or work within annular groove 25. In the embodiment chosen for purposes of illustration, the cross-sectional radial dimension or thickness 49 of annular member 31 is approximately 0.107 of an inch, a standard radial thickness, which is approximately six one-thousandths less than the distance between inner cylindrical sidewall 23 and axial surface 54 of groove 25. A piston ring constructed and arranged in accordance with the principle of the invention as disclosed herein can have other selected axial and radial thicknesses.

And so annular member 31 is elastically expansive and, thus, has a tendency to expand. As installed, annular member 31 is tensioned due to its tendency to expand urging outer contact surface 42 of annular member 31 in sealing engagement against inner cylindrical sidewall 23 of first member 20. The elastic expansiveness or outwardly directed radial force of annular member 31, as indicated by the arrowed line B in FIG. 2, seals contact surface 42 of annular member 31 against inner cylindrical sidewall 23 of first member 20. The fabrication of annular seals having prescribed elastic expansiveness will be readily apparent to those skilled in the art. The unit tension or unit pressure, which is the amount of pressure exerted by outer contact surface 42 of annular member 31 against inner cylindrical wall 23, seals outer contact surface 23 against inner cylindrical wall 23.

Figure 3:
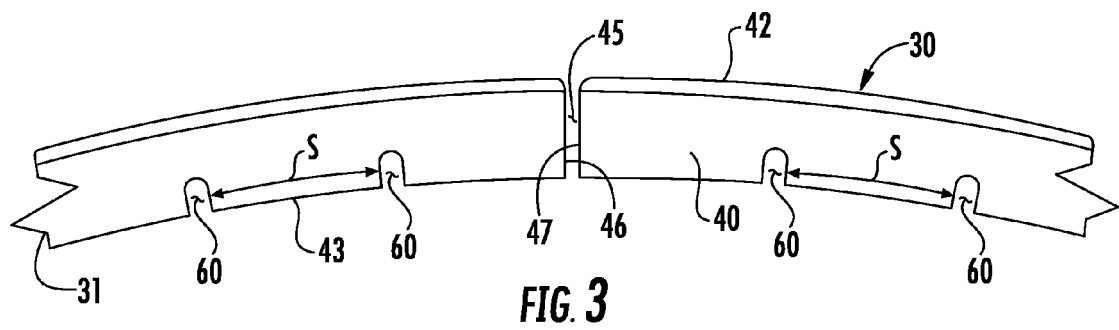
FIG. 3 is an enlarged, fragmentary top plan view of the piston ring of FIG. 1.

Due to the inherent characteristic of annular member 31, tendency to expand, outer contact surface 42 is prone to wear away against inner cylindrical sidewall 23. To partially relieve the inherent tendency of annular member 31 to expand and, thus, to partially relieve the unit tension or unit pressure of annular member 31 when installed while preserving a sufficient tendency of annular ring 31 to expand when tensioned, or otherwise to retain a sufficient amount of unit tension or pressure in annular member 31, so that annular member 31 is sufficiently tensioned when installed to urge outer contact surface 42 of annular member 31 in sealing engagement against inner cylindrical sidewall 23 of first member while reducing the tendency of contact surface 42 to wear prematurely, annular member 31 is radially notched. In FIGS. 1 and 2 notches 60 are formed in inner surface 43 of annular member 31. Notches 60 are spaced-apart along the length of annular member 31 between first end 46 and second end 47. Notches 60 are identical in size and in shape. Notches 60 are radially pointing in that they extend radially inward into annular member 31 from inner surface 43. Notches 60 are each radially perpendicular to the axis about which annular member 31 is arranged, and to linear axis X in FIG. 1 in the installation of piston ring 30 in annular groove 25, linear axis X being the same as the axis about which annular member 31 is arranged. In a further and more specific aspect, in FIGS. 2, 3, and 4, each notch 60 extends radially inward into radial thickness 49 of annular member 31 from inner surface 43 of annular member 31 and axially through axial width 48 of annular member 31 from first radial surface 40 to second radial surface 41. Notches 60 are cut or machined into inner surface 43 of annular member 31, such as with a cutting wire.

Each notch 60 is a relief, or tension-relieving notch, that tends to partially relieve the inherent tendency of annular member 31 to expand and, thus, that tends to partially relieve the unit tension or pressure exerted by annular member 31 in the direction of arrowed line B in FIG. 2 when installed with members 20 and 22. The sum of notches 60, in turn, cooperate to tend to partially relieve the inherent tendency of annular member 31 to expand along the length of annular member 31 from end 46 to end 47 on either side of end gap 45 so as to partially relieve or relax the tension of annular member 31 in the direction of arrowed line B in FIG. 2 when annular member 31 is installed for, in turn, partially relieving the pressure of outer contact surface 42 against inner cylindrical sidewall 23. The unit tension or unit pressure, which is the amount of pressure exerted by outer contact surface 42 of annular member 31 against inner cylindrical wall 23, is reduced via notches 60. In the present embodiment, this reduction in unit tension unit pressure is up to from ten to twenty percent of the unit tension or pressure of a companion piston ring having no such notches 60.

Figure 4:
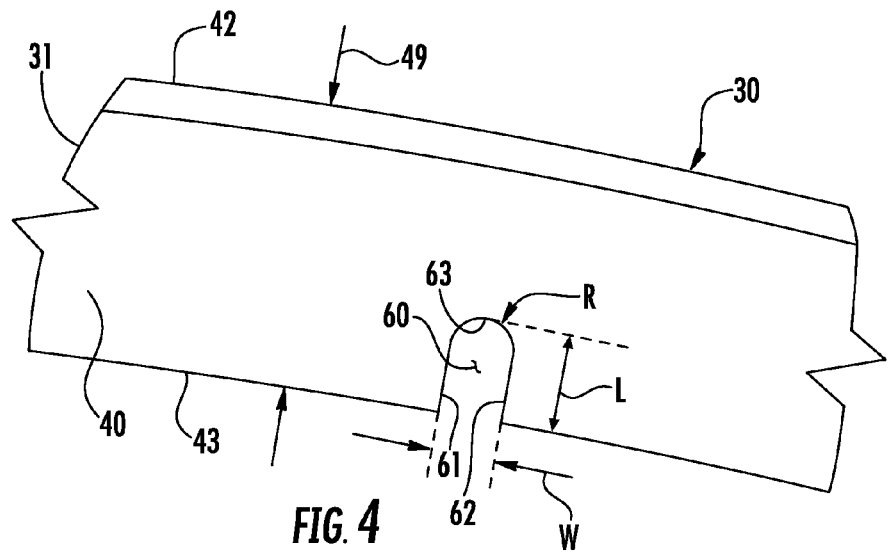
FIG. 4 is an enlarged, fragmentary view corresponding to the view of FIG. 3 illustrating a notch formed in an inner surface of the piston ring.

In FIG. 4, each notch 60 is U-shaped in this embodiment, and is defined by opposed side surfaces 61 and 62 that extend radially inward into annular member 31 from inner surface 43 of annular member 31 to an inwardly-curved notch tip 63. Notch tip 63 is blunt, being rounded along its extent from side surface 61 to side surface 62 and not sharp or pointed from side surface 61 to side surface 62, having no sharp edges or points along its extent from side surface 61 to side surface 62, which beneficially inhibits cracks from forming in annular member 31 from notch tip 63 from side surface 61 to side surface 62 when annular member 31 is tensioned. In other words, notch tip 63 is an inner radius or radial surface that is inherently blunt, again, being rounded and not sharp or pointed, having no sharp edges or points. Side surfaces 61 and 62 are parallel relative to each other in this example, and notch tip 63 is a radius surface.

The width or width dimension W of notch 60 from side surface 61 to side surface 62 is approximately 0.0136 of an inch, the radial length or radial dimension L of notch 60 from inner surface 43 to notch tip 63, namely, the outermost blunted area of notch tip 63, is approximately 0.035 of an inch, and the radius or radius dimension R of notch tip 63 from side surface 61 to side surface 62 is approximately 0.0068 of an inch. These dimensions of notch 60 are chosen to correspond to the standard 0.028 of an inch axial dimension or thickness 48 of annular member, and the standard 0.107 of an inch radial dimension or thickness 49 of annular member 31 so as to prevent annular member 31 from being too flexible, and from being too flexible in the region of each notch 60, losing its ability to seal and to operate according to this disclosure, and to provide that the tension of annular member 31 is sufficiently relieved or relaxed, including in the region of each notch 60. In this example then, the ratio of length L of notch 60 to the radial dimension or thickness 49 of annular member 31 is 1:3.058, the ratio of the radius dimension R of notch 60 and the length L of notch 60 is 1:5.147, and the ratio of the radius dimension R of notch 60 and the width W of notch 60 is 1:2. In other words, in an illustrative embodiment the length L of notch 60 is 32.7% of the radial dimension or thickness 49 of annular member 31, the radius dimension R of notch 60 is 19.4% of the length L of notch 60, and the radius dimension R of notch 60 is 50% of the width W of notch 60.

And so notches 60 are sufficiently dimensioned to provide that the tension of annular member 31 is sufficiently relieved or relaxed according to the principle of the invention while not relieving too much tension of annular member 31 that would cause annular member 31 to become too flexible so as to lose its ability to seal and to operate according to this disclosure. To prevent annular member 31 from becoming too flexible, and from becoming too flexible in the region of each notch 60, and to provide that the tension of annular member 31 is sufficiently relieved or relaxed, including in the region of each notch 60, in an illustrative embodiment the ratio of length L of notch 60 to the radial dimension or thickness 49 of annular member 31 is from 1:2.5 to 1:4.0, the ratio of the radius dimension R of notch 60 and the length L of notch 60 is from 1:4.8 to 1:5.3, and the ratio of the radius dimension R of notch 60 and the width W of notch 60 is from 1:1.8 to 1:2.3. In other words, in an illustrative embodiment the length L of notch 60 is from 25% to 40% of the radial dimension or thickness 49 of annular member 31, the radius dimension R of notch 60 is from 18.9% to 20.8% of the length L of notch 60, and the radius dimension R of notch 60 is from 43.5% to 55.6% of the width W of notch 60. Again, these notch 60 dimension ranges operate to prevent annular member 31 from becoming too flexible, and from becoming too flexible in the region of each notch 60, and to provide that the tension of annular member 31 is sufficiently relieved or relaxed, including in the region of each notch 60.

In the embodiment of FIG. 1, notches 60 are equally spaced-apart circumferentially along the length of annular member 31 between end 46 and end 47, which imparts a constant tension-relieving property to annular member 31 from end 46 to end 47. Further to this, in FIG. 3 there is a space or spacing S between each notch 60 and an adjacent notch 60, and the spacing S between each notch 60 and an adjacent notch 60 is the same, notches 60 and the equal spacing S between each notch 60 and an adjacent notch 60 cooperating thusly to impart a constant annular member tension-relieving property to the annular member 31. In this example, annular member 31 is formed with sixty-six notches 60, which, again are equally spaced-apart circumferentially along the length of annular member 31 between first end 46 and second end 47. With notches 60 formed in annular member 31, annular member 31 is lighter than a corresponding standard piston ring without such notches 60. Notches 60 tend to partially relieve the inherent tendency of annular member 31 to expand and, thus, tend to partially relieve the unit tension or unit pressure of annular member 31 along the length of annular member 31 from end 46 to end 47 in the direction of arrowed line B in FIG. 2 when installed with members 20 and 22 to partially relieve the pressure of outer contact surface 42 of annular member against inner cylindrical outer surface 23, while altogether preserving a sufficient inherent tendency of annular ring 31 to expand when tensioned, unit pressure or unit tension, so that annular member 31 is sufficiently tensioned when installed to urge outer contact surface 42 of annular member 31 in sealing engagement against inner cylindrical sidewall 23 of first member 20, there being sufficient pressure of outer contact surface 42 against inner cylindrical sidewall 23 to produce a sealing engagement of outer contact surface 42 of annular member 31 against inner cylindrical sidewall 23. The tension-relieving property of notches 50 tends to lessen the pressure or force between outer contact surface 42 of annular member 31 and inner cylindrical sidewall 23, which tends to reduce wear to outer contact surface 42 of annular member 31 having the benefit of increasing the operating life of annular member 31, and tends reduce friction between outer contact surface 42 of annular member 31 and inner cylindrical sidewall 23 having the benefit of causing first and second members 20 and 21 to more easily reciprocate relative to one another, which produces increased power and improved gas mileage in internal combustion engines. Moreover, the lightness of annular member 31 compared to a corresponding comparatively heavier standard piston ring annular member also reduces load borne by second member 22, reducing the amount of force required to reciprocate second member 22 relative to first member 21, which, again, has the benefit of producing increased power and improved gas mileage in internal combustion engines.

It is well known that the first few hundred miles of a new engine's life have a major impact on how strongly that engine will perform, how much oil it will consume and how long it will last. The main purpose of break-in is to seat the piston rings to the cylinder walls. Piston ring seating is the physical mating of the engine's piston rings to the corresponding inner cylinder or cylindrical sidewall. Piston ring seating is the physical wearing of the new piston rings into the inner cylindrical sidewall until a compatible seal between the two is achieved, until the piston ring conforms to the inner cylindrical sidewall.

According to the principle of the invention, notches 60 impart in annular member 31 an inherent conformability characteristic causing annular member 31 to physically conform to inner cylindrical sidewall 23 of first member 20, the cylinder, so as to physically mate outer contact surface 42 to inner cylindrical sidewall 23 upon installation of annular member 31 with first member 20 and second member 22, even when the bore or cylinder, first member 20, is not perfectly round, eliminating the need for break-in or for a prolonged break-in. Due to the inherent conformability characteristic that notches 60 impart in annular member 31, seating of annular member 31 requires little or no break-in, little or no physical wearing of outer contact surface 43 of annular member into inner cylindrical sidewall 23, in order to produce a compatible seal, until annular member 31 conforms to inner cylindrical sidewall 23. The described conformability characteristic notches 60 impart to annular member 31 seats annular member 31 to inner cylindrical wall 23 upon installation of annular member 31 with first member 20 and second member 22, which will produce an engine that achieves maximum power output with the least amount of oil consumption and the least amount of produced emissions due to the fact that annular member 31 has seated properly to inner cylindrical sidewall 23. This seating of annular member 31 prevents combustion gases to escape the combustion chamber past annular member 31 into the crankcase section of the engine. This lack of "blow-by" keeps the engine running cleaner and cooler and reduces the engine emissions by preventing hot combustion gases and by-products from entering the crankcase section of the engine. In addition to sealing combustion gases in the combustion chamber, annular member 31 also manages the amount of oil present on inner cylindrical sidewall 23 for lubrication. The seating of annular member 31 as described above allows annular member 31 to perform this function and will prevent excessive amounts of oil to accumulate on inner cylindrical sidewall 23 for, in turn, preventing the burning of oil each and every time the cylinder fires reducing the engine's emissions.

Excessive engine heat and pressures can cause cylinder deforming. The inherent conformability characteristic notches 60 impart to annular member 31 allow annular member 31 to constantly conform to the cylinder inner cylindrical sidewall during engine operation under variable heat and pressures, to constantly conform outer contact surface 42 with inner cylindrical sidewall 23 to constantly maintain the seal and seating between outer contact surface 42 and inner cylindrical sidewall 23.

The tension-relieving property of the sum of notches 60 is a function not only of the dimension of notches in relation to the dimensions of annular member 31, but also the number of notches, and the spacing S between each notch 60 and an adjacent notch 60. The tension-relieving property of notches 60 is increased as the number of notches 60 is increased and the distance between the notches 60 is decreased. The tension-relieving property of notches 60 is decreased as the number of notches 60 is decreased and the distance between the notches 60 is increased. In annular member 31, the number of notches 60 and the distance or spacing S between each notch 60 and an adjacent notch 60 are chosen to produce a pre-selected tension-relieving property, a net unit tension or pressure, in annular member 31, in this example approximately 15 percent of the unit tension or pressure of a companion piston ring having no such notches 60 having a unit pressure or tension of approximately 1.0 pound force (lbf). And so in this example, the unit tension or pressure of annular member is 0.85 lbf. Any desired number of notches 60 can be used and any selected spacing can be used between adjacent notches 60, including equal spacings, or variable spacings, including a preselected combination of equal and variable spacings, so as to set the piston ring to a preselected unit tension or pressure. And so depending on the needs of the skilled artisan, the number of notches 60 and the spacing between each notch 60 and an adjacent notch can be chosen to produce a pre-selected tension-relieving property in the annular member 31 so as to set annular member 31 to a preselected unit tension or pressure.

It is to be emphasized that the 0.028 of an inch axial dimension or thickness 48 of annular member, and the standard 0.107 of an inch radial dimension or thickness 49 of annular member 31 are standard dimensions and are chosen in this example for the purposes of illustration. A radially notched piston ring constructed and arranged in accordance with the principle of the invention can have other axial and radial dimensions without departing from the invention, with notches that that dimensionally correspond into the selected ring size as discussed in detail above.

Figure 5:
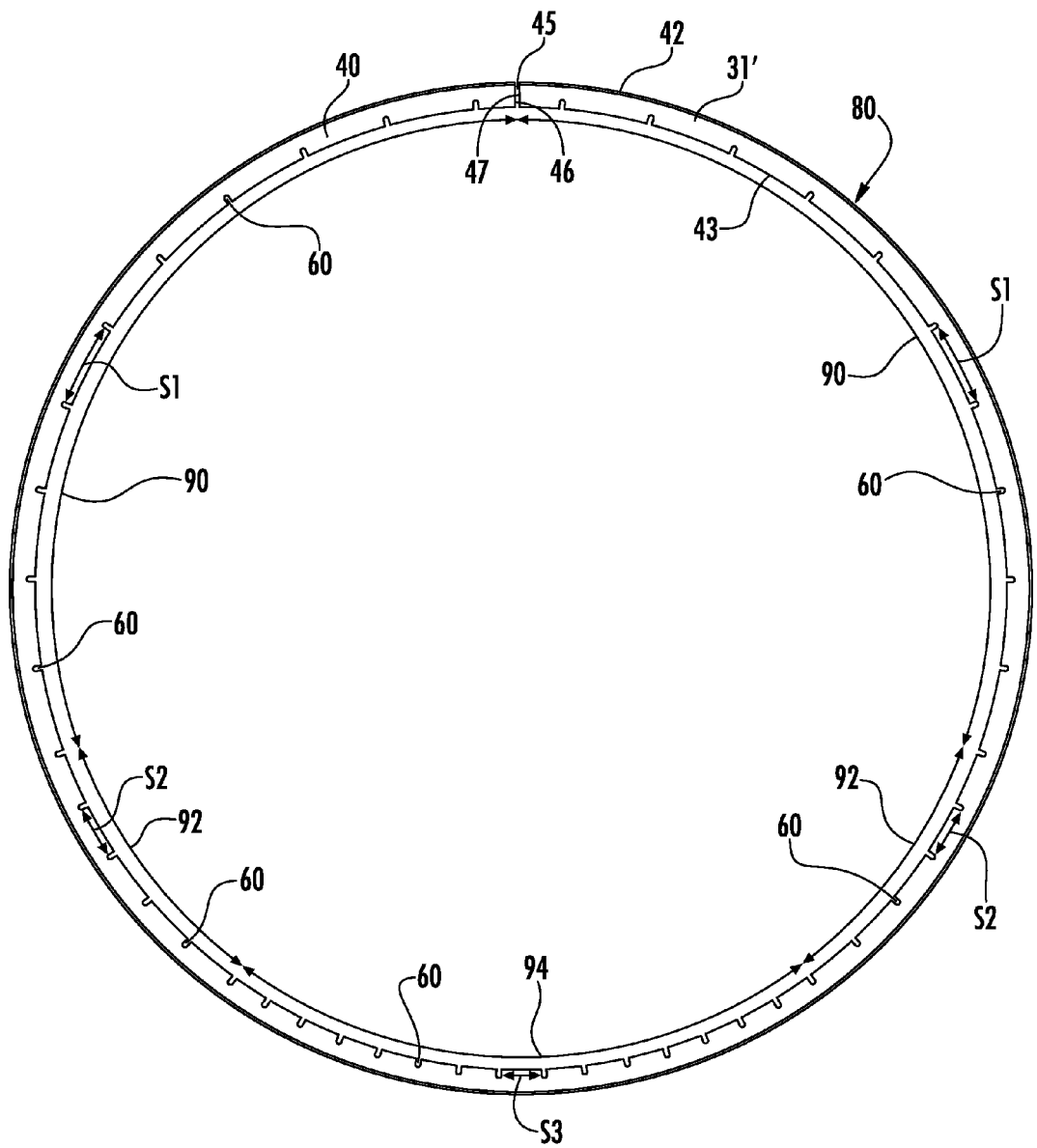
FIG. 5 is a top plan view of an alternate embodiment of a radially notched piston ring constructed and arranged in accordance with the principle of the invention.

Attention is now directed to FIG. 5 illustrating a top plan view of an alternate embodiment of a piston ring 80 constructed and arranged in accordance with the principle of the invention. Piston ring 80 is identical in every respect to piston ring 30 in that it shares tensionable annular member 31, first radial surface 40, second radial surface 41 (not shown), outer contact or sealing surface 42, inner surface 43, end gap 45, first and second ends 46 and 47, a length from first end 46 to second end 47, notches 60, and the axial dimension or thickness and the radial dimension or thickness as described in piston ring 30. Piston ring 80 is installed with members 20 and 22 in the same way as piston ring 30. Accordingly, with the exception the differences discussed below, the descriptions of piston ring 30 and the installation of piston ring 30 with first and second members 20 and 22 apply in every respect to piston ring 80. For clarity of the ensuing discussion, annular member 31 of piston ring 80 is denoted with a prime ("'") symbol throughout the ensuing discussion of piston ring 80.

The unit tension or pressure of a ring is defined is the net unit tension or pressure exerted by the ring. In standard piston rings, the inherent tension applied by the piston ring tends to vary across the length of the piston ring. It is known that the inherent tension tends to gradually increase from the end gap to along the sides of the piston ring and to the opposite end of the piston ring opposing the end gap. As initially installed with a pair of reciprocally movable members, this uneven tension can produce an uneven tension/pressure of the contact surface of the piston ring against the inner cylindrical sidewall. During initial operation, the outer contact surface of the piston ring is worn away at the areas of high tension more quickly that at lower tensioned areas of the piston ring until wear-in or seating of the seal is accomplished. Even after seating, the uneven tension of the piston ring produces uneven wear, not only to the piston ring but also the inner cylindrical surface.

To alleviate these problems, to produce a piston ring with a unit tension pressure that is constant and even along the entire extent of the ring, and to produce initial seating upon installation and to inhibit uneven wear, in annular member 31' of piston ring 80 notches 60 are not equally spaced-apart circumferentially along the length of annular member 31' between end 46 and end 47, and are variably spaced-apart circumferentially along the length of annular member 31' between end 46 and end 47 to impart a variable tension-relieving property to annular member 31' from end 46 to end 47, smoothing out the uneven unit tension or pressure resulting in annular member 41 having an even and constant unit tension or pressure along the length of annular member 31' from end 46 to end 47 when tensioned in the installation of annular member 21 with a pair of reciprocally movable members, such as first and second members 20 and 22 discussed in conjunction with piston ring 30. This even and constant unit tension or pressure produced by the variable tension-relieving property to annular member 31' from end 46 to end 47 by notches 60 and variable spacings between adjacent notches 60 produces an even and constant pressure of contact surface 42 against the inner cylindrical sidewall 23 reducing friction, thereby improving fuel economy, power, and cylinder sealing in an internal combustion engine. As described above with piston ring 30, in piston ring 80 notches 60 impart in annular member 31' the inherent conformability characteristic causing annular member 31' to physically conform to inner cylindrical sidewall 23 of first member 20, the cylinder, so as to physically mate outer contact surface 42' to inner cylindrical sidewall 23 upon installation of annular member 31' with first member 20 and second member 22, even when the bore or cylinder, first member 20, is not perfectly round, eliminating the need for break-in or for a prolonged break-in.

In FIG. 5 there is a spacing S between each notch 60 and an adjacent notch 60, and the spacing S between each notch 60 and an adjacent notch 60 is varied along the length of annular member 31' from end 46 to end 47, the dimension of spacings S incrementally decreases from end gap 45 to the opposite end of annular member 31' and, moreover, incrementally increases from the opposite end of annular member 31' to end gap 45. In the example shown in FIG. 5, notches 60 are arranged in groups including groups 90, groups 92, and group 94. Groups 90 of notches 60 extend along either side of end gap 45 from ends 46 and 47, respectively, of annular member 31' to groups 92 of notches 60 which, in turn, extend along further along either side of annular member 31' from the respective groups 90 of notches 60 to group 94 of notches 60 along the opposite end of annular member 31' opposing end gap 45 between groups 92 of notches 61. Groups 90 include the same number of notches 60, and groups 92 include the same number of notches 60. Groups 90 of notches 60 each share a notch with the respectively groups 92 of notches 60, and groups 92 of notches 60 each, in turn, share a notch 60 at either end of group 94 of notches 60.

In each group 90 of notches 60 there is a space or spacing S1 between each notch 60 and an adjacent notch 60, in each group 92 of notches 60 there is a space or spacing S2 between each notch 60 and an adjacent notch 60, and there is a space or spacing S3 between each notch 60 and an adjacent notch 60 in group 94 of notches 60. Spacings S1, S2, and S3 are different from one another. Spacings S1 are the same or otherwise identical, spacings S2 are the same or otherwise identical, and spacings S3 are the same or otherwise identical. Each spacing S1 is greater than each spacing S2, and each spacing S2 is greater than each spacing S3. In other words, each spacing S3 is less than each spacing S2, and each spacing S2 is less than each spacing S1.

Accordingly, the tension-relieving properties of groups 90 of notches 60 on either side of annular member 31' from end gap 45 to groups 92 of notches 60 are the same and are less than the tension-relieving properties of groups 92 of notches 60, and the tension-relieving properties of groups 92 of notches 60 on either side of annular member 31' from the respectively groups 90 of notches 60 to group 94 of notches 60 are the same and are less than the tension-relieving property of group 94 of notches 60 at the end of annular member 31' opposite to end gap 45. In other words, the tension-relieving property of group 94 of notches 60 is greater than the tension-relieving properties of groups 92 of notches 60, and the tension-relieving properties of groups 92 of notches 60 are the same and are greater than the tension-relieving properties of group 90 of notches 60. With this arrangement, group 94 of notches 60 has the highest tension-relieving property where the annular member 31' tension tends to be highest. Groups 90 of notches 60 have a lower tension-relieving property where the annular member 31' tension tends to be lowest compared to the tension-relieving property of group 94 of notches 60. Groups 92 of notches 60 extend along the opposed sides of annular member 31' between the respective groups 90 of notches 60 and group 94 of notches 60 where the tension of annular member 31' tends to be between the highest tension of annular member 31' at group 94 of notches 60 and the lowest tension of annular member 31' at groups 90 of notches 60. Accordingly, the tension-relieving property of groups 92 of notches 60 is less than the tension-relieving property of group 94 of notches 60, and is greater than the tension-relieving property of groups 90 of notches 60.

The varied spacing between each notch 60 and an adjacent notch 60 of the various groups 90, 92, and 94 of notches 60 thusly imparts a variable annular member tension-relieving property to annular member 31', which, when installed, causes annular member 30 to impart an even unit tension or pressure of contact surface 42 of annular member 31' against the inner cylindrical sidewall. During initial installation of piston ring 80, and due to the inherent conformability characteristic notches 60 impart to annular member 31', the outer contact surface 42 of annular member 31' is thereby initially seated eliminating the need for break-in or for a prolonged initial break-in or wear-in to occur. After seating, the even unit pressure or tension of contact surface 42 of annular member 31' against the inner cylindrical sidewall equalizes the load at outer contact surface 42 against the inner cylindrical sidewall 23, tending to reduce friction and reduce premature wear of contact surface 42, improving fuel economy and power output and cylinder sealing in an internal combustion engine. And so the even and constant unit tension or pressure produced by the variable tension-relieving property to annular member 31' from end 46 to end 47 by notches 60 and variable spacings S between adjacent notches 60 produces an even and constant pressure of contact surface 42 against the inner cylindrical sidewall 23 reducing friction, thereby improving fuel economy, power, and cylinder sealing in an internal combustion engine.

The invention has been described above with reference to illustrative embodiments. However, those skilled in the art will recognize that changes and modifications can be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:

1. A piston ring to be received within an annular groove having opposed radial surfaces and carried by one of a pair of relatively reciprocally movable members for sealing engagement with a sidewall of the other of said pair of relatively reciprocally movable members and for minimizing fluid leakage between said members, said piston ring comprises a tensionable annular member that includes a first radial surface for residing adjacent to one of the radial surfaces of said groove, a second radial surface for residing adjacent to the other one of the radial surfaces of the groove, an outer contact surface engagable with the sidewall, an opposed inner surface, an end gap that severs the annular member and that defines spaced-apart first and second ends of the annular member, a length of the annular member from the first end to the second end, and annular member tension-relieving notches formed in the inner surface of the annular member, said notches are spaced-apart along the length of the annular member between the first end and the second end, each notch has a blunt notch tip for inhibiting crack propagation in the annular member from said blunt notch tip when the annular member is tensioned, a notch spacing between each notch and an adjacent notch, the notch spacings incrementally decrease in size from the end gap to an end of the annular member opposing the end gap imparting a variable annular member tension-relieving property to the annular member enabling the annular member to impart an even pressure of the contact surface against the sidewall, when the annular member is received within the annular groove of the one of the pair of relatively reciprocally movable members.

2. The piston ring according to claim 1, wherein each notch extends radially inward into the annular member from the inner surface thereof.

3. The piston ring according to claim 1, wherein said notches are equally sized.

4. A piston ring to be received within an annular groove having opposed radial surfaces and carried by one of a pair of relatively reciprocally movable members for sealing engagement with a sidewall of the other of said pair of relatively reciprocally movable members and for minimizing fluid leakage between said members, said piston ring comprises a tensionable annular member that includes a first radial surface for residing adjacent to one of the radial surfaces of said groove, a second radial surface for residing adjacent to the other one of the radial surfaces of the groove, an outer contact surface engagable with the sidewall, an opposed inner surface, an end gap that severs the annular member and that defines spaced-apart first and second ends of the annular member, an axial width from the first radial surface to the second radial surface, a radial thickness from the outer contact surface to the inner surface, a length of the annular member from the first end to the second end, and annular member tension-relieving notches formed in the inner surface of the annular member, said notches are equally spaced-apart along the length of the annular member between the first end and the second end, each notch extends radially inward into the radial thickness of the annular member from the inner surface of the annular member and axially through the axial width of the annular member from the first radial surface to the second radial surface, each notch is defined by opposed first and second side surfaces that extend radially inward from the inner surface of the annular member to a blunt notch tip, the blunt notch tip inhibits crack propagation in the annular member from said blunt notch tip when the annular member is tensioned, a first ratio of from 1:2.5 to 1:4.0 of the notch length and the radial thickness of the annular ring, a second ratio of from 1:4.8 to 1:5.3 of the notch radius to the notch length, a third ratio of from 1:1.8 to 1:2.3 of the notch radius to the notch width, wherein the first ratio, the second ratio, and the third ratio enable the annular member to expand when tensioned, to remain sufficiently tensioned to urge the outer contact surface of the annular member in sealing engagement against the sidewall, and to conform to the sidewall while reducing a tendency of the outer contact surface to wear prematurely and disabling the annular member from becoming too flexible, when the annular member is received within the annular groove of the one of the pair of relatively reciprocally movable members.

5. The piston ring according to claim 4, wherein said notches are equally sized.

6. The piston ring according to claim 4, wherein a spacing between each notch and an adjacent notch imparts a constant annular member tension-relieving property to the annular member.

7. The piston ring according to claim 6, wherein the spacing between each said notch and an adjacent notch is the same.

8. The piston ring according to claim 4, wherein a spacing between each said notch and an adjacent notch imparts a variable annular member tension-relieving property to the annular member.

9. The piston ring according to claim 8, wherein the spacing between each notch and an adjacent notch is varied.

10. The piston ring according to claim 4, wherein each notch includes a notch width from the first side surface to the second side surface, a notch length from the inner surface of the annular ring to the notch tip, and a notch radius of the blunt notch tip.

11. A piston ring to be received within an annular groove having opposed radial surfaces and carried by one of a pair of relatively reciprocally movable members for sealing engagement with a sidewall of the other of said pair of relatively reciprocally movable members and for minimizing fluid leakage between said members, said piston ring comprises a tensionable annular member that includes a first radial surface for residing adjacent to one of the radial surfaces of said groove, a second radial surface for residing adjacent to the other one of the radial surfaces of the groove, an outer contact surface engagable with the sidewall, an opposed inner surface, an end gap that severs the annular member and that defines spaced-apart first and second ends of the annular member, a length of the annular member from the first end to the second end, and annular member tension-relieving notches formed in the inner surface of the annular member, said notches are spaced-apart along the length of the annular member between the first end and the second end, each notch has a blunt notch tip for inhibiting crack propagation in the annular member from said blunt notch tip when the annular member is tensioned, a notch spacing between each notch and an adjacent notch, the notches are arranged in groups, the notch spacings of each group are the same, the notch spacings of the groups decrease in size from the end gap to an end of the annular member opposing the end gap imparting a variable annular member tension-relieving property to the annular member for enabling the annular member to impart an even pressure of the contact surface against the sidewall, when the annular member is received within the annular groove of the one of the pair of relatively reciprocally movable members.

12. The piston ring according to claim 11, wherein each notch extends radially inward into the annular member from the inner surface thereof.

13. The piston ring according to claim 11, wherein said notches are equally sized.

14. The piston ring according to claim 11, wherein the groups comprises:
   first groups;
   second groups;
   a third group;
   the first groups extend along either side of the end gap from the first and second ends of the annular member to the second groups, the second groups extend along either side of the annular member from the respective first groups the third group, and the third group extends along an opposite end of the annular member opposing the end gap;
   the notch spacings of the second groups are less than the notch spacings of the first groups, and are greater than the notch spacings of the third group;
   the notch spacings of the first groups imparts a first annular member tension-relieving property to the annular member, the notch spacings of the second groups imparts a second annular member tension-relieving property to the annular member, and the notch spacings of the third group imparts a third annular member tension-relieving property to the annular member; and
   the second annular member tension-relieving property is greater than the first annular member tension-relieving property and is less than the third annular member tension-relieving property.

15. The piston ring according to claim 14, wherein the notches of first groups are equal in number, and the notches of the second groups are equal in number.

* * * * *